Feb. 20, 1968 P. R. BLOMSTER 3,370,188
PIEZOELECTRIC CRYSTAL SUPPORT STRUCTURE
Filed Jan. 21, 1966
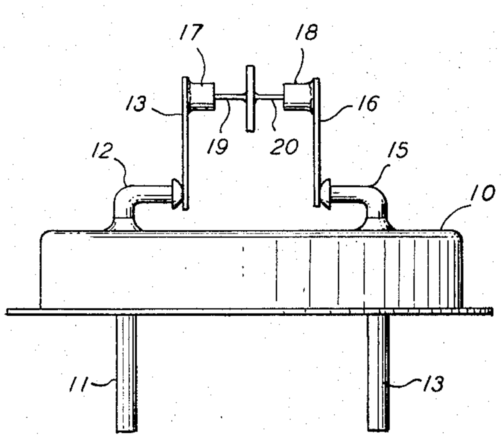
INVENTOR
P. R. BLOMSTER
BY [signature]
ATTORNEY United States Patent Office 3,370,188
Patented Feb. 20, 1968

3,370,188

PIEZOELECTRIC CRYSTAL SUPPORT STRUCTURE

Paul R. Blomster, Emmaus, Pa., assignor to Bell Telephone Laboratories, Incorporated, New York, N.Y., a corporation of New York Filed Jan. 21, 1966, Ser. No. 522,114
1 Claim. (Cl. 310—9.1)

This invention relates to piezoelectric crystal units and specifically concerns the mechanical mounting of crystals in piezoelectric devices.

Piezoelectric devices such as filters and oscillators employ crystal bodies which are usually supported mechanically by support wires that function also as electrical leads. The problem is to support the crystal body in a manner which permits the crystal to resonate as freely as possible while still providing adequate mechanical support. Since these design criteria are quite opposite it is extremely difficult to provide an adequate support structure for a crystal unit destined for a severe mechanical environment.

Low frequency resonances in the crystal mountings which are produced by mechanical shock in the use environment obviously can be eliminated by making the support structure more rigid. However, such a procedure results in clamping the crystal plate thereby reducing its Q and causing other impairments of the electrical characteristics.

According to the present invention a crystal mount is provided which has sufficient rigidity to eliminate low frequency resonances and yet has sufficient flexibility to allow for relief of strains on the crystal plate. This is achieved using a composite support structure in which one of the supports is rigid and the other flexible. Providing one support member with a stiffness in the range of 0.5 to 10 pounds per inch of deflection and the other support member with a stiffness of at least 80 pounds per inch of deflection results in a structure which gives sufficient strain relief to the crystal and also is rigid enough to eliminate low frequency resonances.

This aspect of the invention as well as others will become apparent from the following detailed description.

In the drawing:

The figure is a front elevation of a crystal unit in which the crystal support is constructed according to the invention.

A crystal unit supported in accordance with the principles of this invention is shown in the figure. The base 10 is a conventional copper header. The electrode pin 11 is a rigid 40 mil nickel wire extending through the base 10 and terminating in a horizontal portion 12. A flat relatively rigid nickel ribbon 13 is welded or otherwise affixed to the end of the wire portion 12. The nickel ribbon is 50 mils wide by 15 mils thick and has a rigidity of approximately 80 pounds per inch of deflection. The other wire support is similarly constructed and comprises a rigid wire 14 extending through the base and terminating in the horizontally extending portion 15. A flexible member 16 is welded or otherwise affixed to the end of the wire 15. The flexible member in this case is a nickel ribbon having a width of 50 mils, a thickness of 5 mils, and a rigidity of 3 pounds per inch of deflection. The ribbon

16 can also be affixed directly to the base member 10. Copper damping weights 17 and 18 are affixed to the support members and the phosphor-bronze lead wires 19 and 20 support the crystal 21 in the usual manner. Where the crystal is large more than two wire supports may be used. These latter structural features are conventional except that the use of one flexible and one rigid support member permit the damping weights to be attached directly to the support members rather than being carried by the wire as in most conventional designs. However, the position of the damping weights relative to the support members is a matter of choice and is not restricted according to the teachings of this invention.

The flexible support member 16 is shown in the figure as a ribbon. Ribbons having stiffness coefficients as small as 0.5 pound per inch of deflection up to about 10 pounds per inch of deflection are effective when used with a rigid member having a stiffness of at least 80 pounds per inch. Since the function of the rigid member is solely to provide rigidity there is no upper limit on its stiffness. However, the shape of the member is not critical as long as the relative flexibility requirement is met. A wire may be found convenient in many cases.

The material of which the supports are constructed is also not critical except insofar as it affects the rigidity. The supports in the usual construction are electrically conductive and may be silver, gold, aluminum, nickel, copper or an alloy such as brass. The wires 19 and 20 are almost invariably beryllium-copper or Phosphor bronze. The crystal 21 may be any piezoelectric material useful in resonant devices of the character described. In the usual case this crystal is quartz.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A piezoelectric crystal unit comprising a flat piezoelectric crystal plate, at least two wires attached to the major faces of the crystal plate, a support structure for suspending the crystal between said wires, said support structure comprising one relatively rigid member and one relatively flexible member, said relatively rigid member having a stiffness coefficient of at least 80 pounds per inch of deflection and said relatively flexible member having a stiffness coefficient in the range 0.5 to 10 pounds per inch of deflection and a base member for mounting each of said members in spaced parallel relationship.

References Cited

UNITED STATES PATENTS

| | | | |
|---|---|---|---|
| 2,830,203 | 4/1958 | Potter | 310—9.1 |
| 2,831,989 | 4/1958 | Ianouchevsky | 310—9.1 |
| 3,054,915 | 9/1962 | Houck | 310—9.1 |
| 2,965,773 | 12/1960 | Hill | 310—9.1 |
| 3,221,189 | 11/1965 | Brandt | 310—9.1 |
| 3,340,410 | 9/1967 | Sanford | 310—9.1 |

LEE T. HIX, *Primary Examiner.*

J. D. MILLER, *Assistant Examiner.*